United States Patent [19]
Hoffmeister

[11] 3,936,089
[45] Feb. 3, 1976

[54] GRIPPING DEVICE FOR A LIFTING MECHANISM, ESPECIALLY IN A CORE REACTOR FOR DEPOSITING AND PICKING UP FUEL ELEMENTS AND CONTROL RODS

[75] Inventor: Bernhard Hoffmeister, Wilhelmshaven, Germany

[73] Assignee: Fried. Krupp Gesellschaft mit beschrankter Haftung, Essen, Germany

[22] Filed: July 2, 1974

[21] Appl. No.: 485,265

[30] Foreign Application Priority Data
Sept. 1, 1973 Germany............................ 2344264

[52] U.S. Cl............... 294/86 A; 176/30; 176/36 R; 294/86.15; 294/88
[51] Int. Cl......................... B66c 1/66; G21c 19/10
[58] Field of Search............ 294/86 A, 86.15, 86.26, 294/86.29, 86.33, 88, 115; 176/27, 30, 33, 36 R, 36 C; 214/18 N

[56] References Cited
UNITED STATES PATENTS

| | | | |
|---|---|---|---|
| 3,567,579 | 3/1971 | Hubler et al........................ | 176/30 |
| 3,690,715 | 9/1972 | Vanlingen et al..................... | 294/88 |

FOREIGN PATENTS OR APPLICATIONS

| | | | |
|---|---|---|---|
| 819,966 | 9/1959 | United Kingdom............... | 294/86 A |
| 1,342,267 | 9/1963 | France............................. | 294/86 A |

Primary Examiner—Richard A. Schacher
Assistant Examiner—Johnny D. Cherry
Attorney, Agent, or Firm—Walter Becker

[57] ABSTRACT

A gripping device, especially for use for depositing and withdrawing fuel elements and control rods in a nuclear reactor, in which the gripping device has an upper body part connected to a hoisting and transporting mechanism and a lower part reciprocably suspended on the upper part. The lower part at the bottom has gripping means for engaging a gripping tool which, in turn, has gripping means for engaging a fuel element or a control rod. The lower part of the body has a power operable device for each of the gripping means and each power operable device is spring urged toward coupling position. A locking device pivotally mounted in the lower part of the body is actuated into locking position by upward movement of the upper part on the lower part and when in locking position locks the power operable device in coupling position.

5 Claims, 5 Drawing Figures

GRIPPING DEVICE FOR A LIFTING MECHANISM, ESPECIALLY IN A CORE REACTOR FOR DEPOSITING AND PICKING UP FUEL ELEMENTS AND CONTROL RODS

The invention relates to a gripping device of a lifting mechanism for longitudinal bodies which pertain to at least two different groups with different functions, especially in a core reactor for depositing and picking up fuel elements and control rods with a gripping body adapted to be lifted and lowered. With the gripping device according to the present invention, only one of the various gripping tools, each of which is determined for a group of longitudinally extending bodies, is adapted to be coupled with the gripping body while the latter comprises a power operable device for operating all gripping tools.

With the gripping device according to the invention, the coupling of one of the gripping tools each to the gripping body is effected, for instance, in such a way that a collar extending from the gripping body in downward direction immerses into a bore of the gripping tool until it hits an abutment while balls located in radial bores of the collar enter into an annular groove in said bore and are prevented from leaving the bore by a slide. The slide is adapted to be lifted and lowered by another power operable device arranged above the first power operable device and within the gripping body. Both power operable devices have pistons acted upon by pressure springs with downwardly directed forces which pressure springs are respectively arranged in the pertaining cylinders and have the tendency to couple a control rod head or a fuel element head to a gripping tool, in other words, to couple the tool to the gripping body. The pistons of the two power operable devices are adapted to be acted upon by compressed air from below in order to disengage the coupling devices.

It is an object of the present invention further to improve the conditions of operation for a gripping device of the above mentioned type.

It is another object of this invention so to design the gripping device that the springs pertaining to the two power operable devices can be easier checked and will be better accessible so that the exchange of the spring will be facilitated.

Still another object of this invention consists in providing more favorable conditions for the mounting of a blocking device which will prevent the pistons of the power operable devices from moving upwardly by compressed air into disengaging positions as long as the gripping tool and as the case may be a fuel element or bundle of control rods coupled thereto is by said lifting device held in suspension.

These and other objects and advantages of the invention will appear more clearly from the following specification, in connection with the accompanying drawings, in which.

Figure 1:
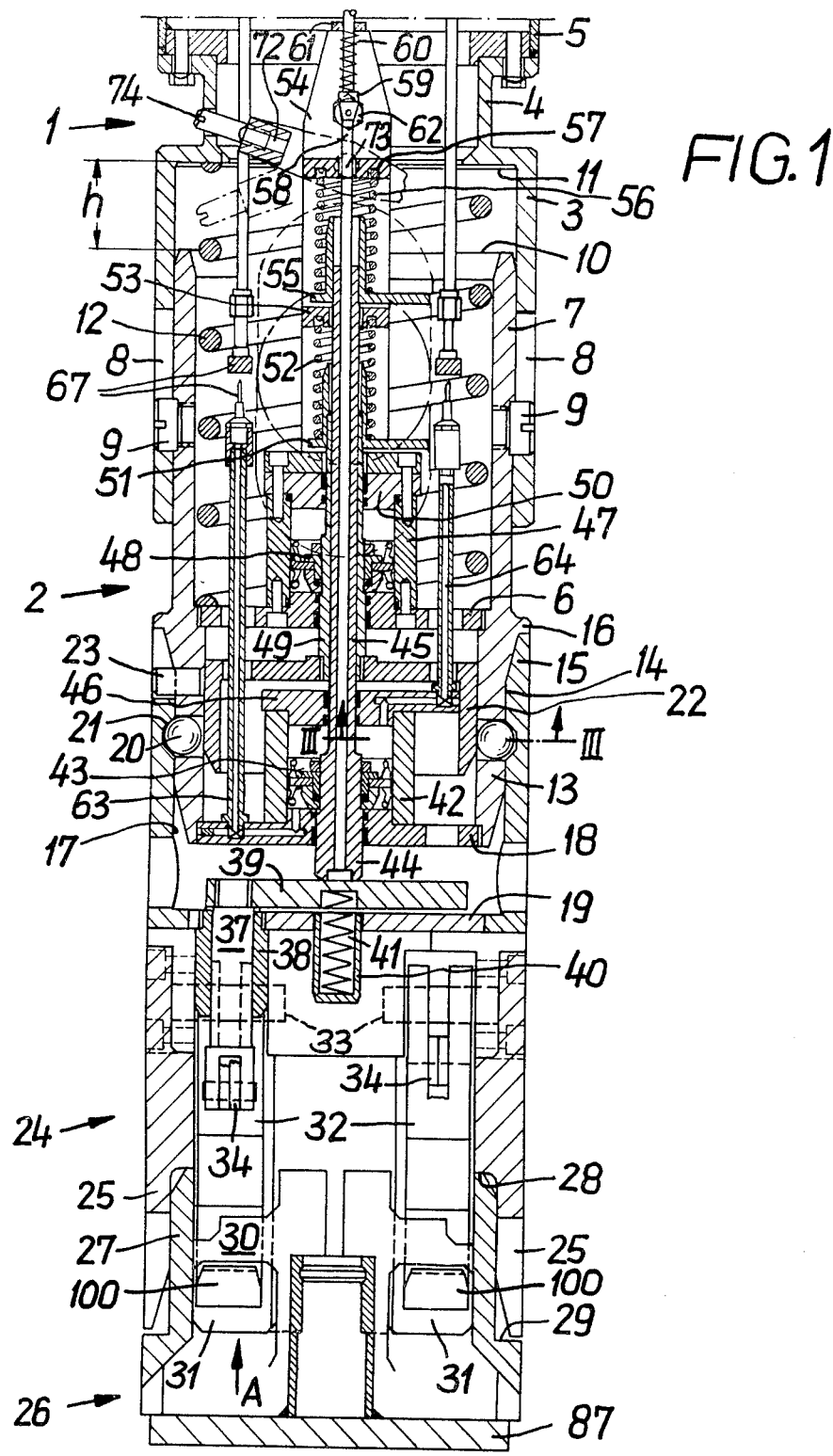
FIG. 1 illustrates an axial section through the lower portion of a gripping device according to the invention and through a fuel element head, said section being taken along the line I—I of FIG. 3.

One of the primary features of the present invention consists in that the springs of the two power operable devices above the upper power operable device are arranged one above the other between counterbearings on the gripping body and on rods extending from the pistons in upward direction while one rod is by the piston of the lower power operable device passed through a bore of the other rod.

Referring now to the drawings in detail, a gripping body is by means of rollers slidably vertically guided within the nonillustrated guiding post which extends downwardly from the frame of a loading device. The gripping body comprises a longer upper section 1 and a lower shorter section 2. The section 1 is by means of cables suspended on a nonillustrated lifting mechanism which is located on the loading device. The two sections 1, 2 represent hollow bodies of square-shaped cross section and are telescopically guided one within the other. The upper section 1 of the gripping body has its lower portion end in a box 3 which opens downwardly. This box 3 has its upper side provided with a collar 4 which by means of a flange is screwed onto the upwardly following portion 5 of the upper section 1 of the gripping body.

The lower section 2 of the gripping body has an intermediate bottom 6. From this bottom, walls 7 extend upwardly which extend around a chamber open at the top and slidably engage the inner surfaces of the walls of said box.

The walls of box 3 have vertical slots 8 which are closed at the top and at the bottom. These slots 8 are engaged by heads 9 of screws which are located in the walls 7. As a result thereof, the movement of the lower section 2 of the gripping body relative to the upper section 1 is limited in downward direction, as will be evident from FIG. 1. In the lowermost position of section 2 of the gripping body, the screws 9 engage the lower confining surfaces of the slots 8. The movement of the lower section 2 in upward direction is limited due to the fact that the upper end faces 10 of the wall 7 engage an annular surface 11 on the bottom side of a shoulder of said box 3. The stroke thus made possible is characterized by the distance $h$. In the interior of box 3 and within the space confined by the wall 7 there is provided a helical pressure spring 12 which in downward direction rests against the intermediate bottom 6 and in upward direction rests against the annular surface 11.

Figure 2:
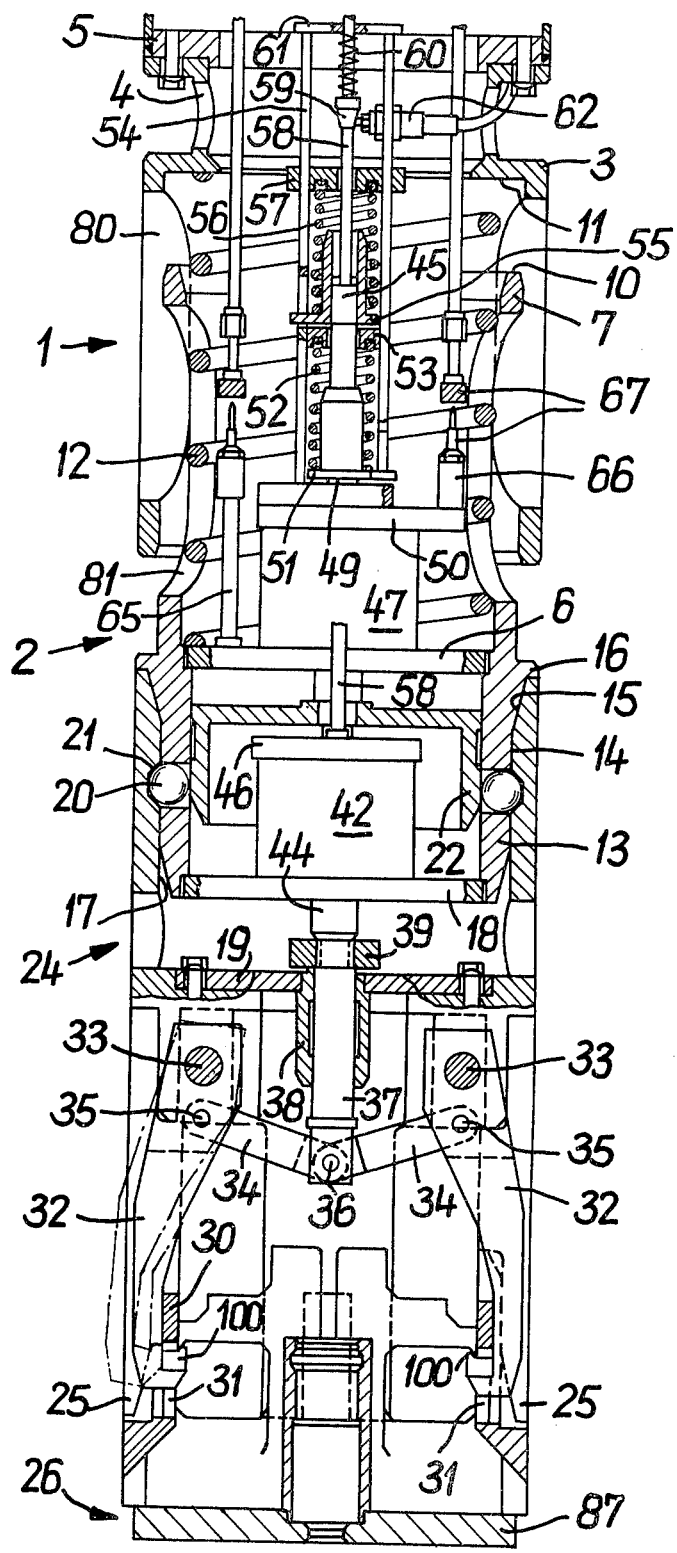
FIG. 2 is a section through the gripping device and the fuel element head in the lower portion along the line II—II of FIG. 3 and in the upper portion along the line IIa—IIa of FIG. 3.
Figure 4:
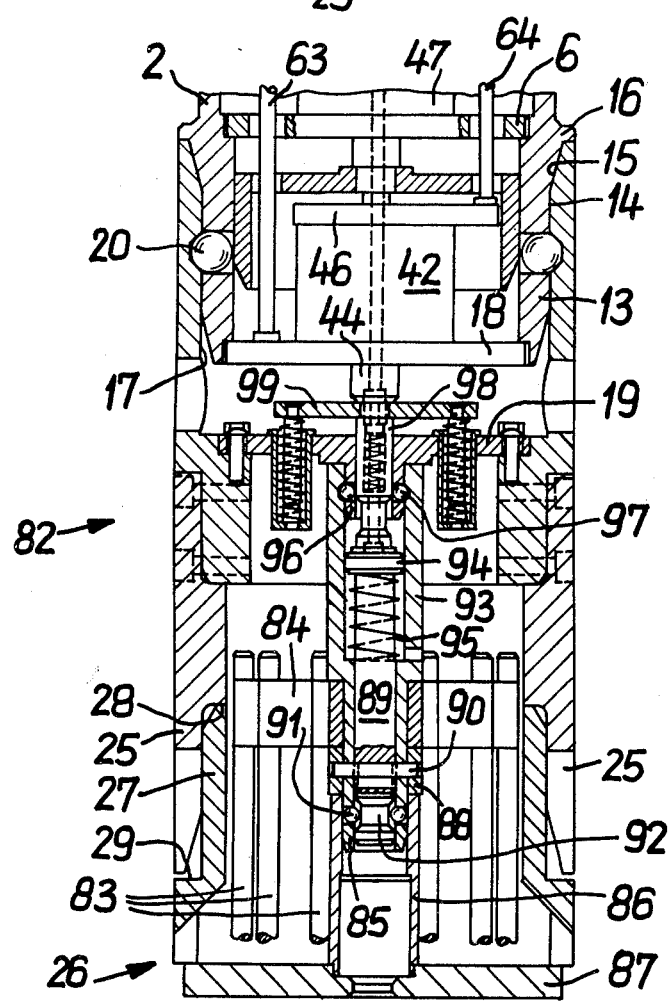
FIG. 4 illustrates the lower portion of the gripping device with another gripping tool and a control rod head in an axial section similar to the section of FIG. 1.

The lower portion 2 of the gripping body has a cylindrical collar 13 which extends from the intermediate bottom 6 in downward direction. The cylindrical circumferential surface 14 of collar 13 continues in upward direction as a conically widening surface 15 and extends to a flange 16 whereas said cylindrical circumferential surface 14 tapers at the lower end of the collar 13. The collar 13 serves to establish a positive coupling connection between the lower section 2 of the gripping body and a gripping tool. All gripping tools have the same square-shaped cross section as the box 3 and the portion 5 of the upper section 1 of the gripping body. All gripping tools also have the same height and, with regard to the design of their upper sections for coupling to the gripping bodies, are of the same construction. The upper portion of all gripping tools is provided with wide bores 17 of the same diameter and the same depth. Fitting into the bore 17 of each gripping tool is the circumferential surface of the collar 13 of the lower section 2 of the gripping body. FIGS. 1, 2 and 4 show that the collar 13 has been inserted into the bore 17 of a gripping tool until its flange 16 engages the upper rim portion of the gripping tool. The conical surface 15 engages a corresponding surface with which the bore 17 widens in upward direction. A bottom 18 which closes the collar 13 at the lower end is spaced from the bottom 19 of the gripping tool, which bottom closes the lower end of bore 17. In radial bores located in the collar 13 at approximately half the height there are provided balls 20, the diameter of which nearly equals the diameter of the bores and is somewhat greater than the thickness of the collar 13. In the illustrated coupling condition, the balls engage an annular groove 21 in bore 17. The balls 20 are prevented from leaving said annular groove by a pot-shaped slide 22 which opens in downward direction and which within the collar 13 is slidably guided and in the illustrated lowermost position closes the radial bores toward the interior. In this way the gripping tool is coupled to the lower section 2 of the gripping body. The gripping tool is arranged relative to the box 3 in such a way that its lateral surfaces are flush with the lateral surfaces of the box. This is effected by means of a pivot 23 which fits into a slot that is open toward the top and located in a wall of the gripping tool.

Figure 3:
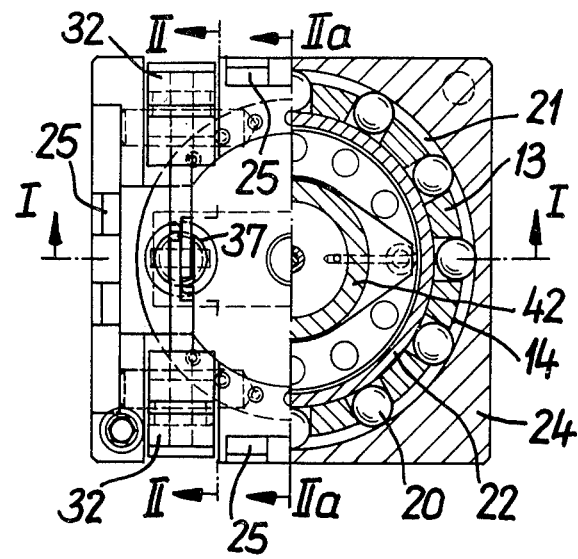
FIG. 3 shows in the left part thereof a view looking in the direction of the arrow A in FIG. 1, and on the right-hand side shows a section taken along the line III—III of FIG. 1.

FIGS. 1, 2 and 3 show that a fuel element-gripping tool 24 is coupled to the gripping body. This tool 24 is on each side provided with a downwardly extending forked finger 25, said fingers having their inner surfaces engaging fingers 27 which from the fuel element head 26 extend upwardly. The fuel element-gripping tool 24 rests by means of a shoulder surface 28 on the upper end face of said fingers 27. The lower tapering ends of the fingers 25 extend to nearly over the shoulder surfaces 29 of the fuel head. This head is, between the upwardly extending fingers 27, provided with walls 30 with two windows 31 each having an approximately rectangular contour. As will be evident from FIG. 2, the lower hook-shaped ends of the gripping pawls 32 are adapted to engage two pairs of oppositely located windows 31. These pawls 32 are pivotally journaled by horizontally arranged bolts 33 in the fuel element-gripping tool 24 close below the bottom 19. Each two gripping pawls 32 located opposite to each other are interconnected by an elbow lever linkage system. This linkage system has two identical linkage members 34 which on one hand, by means of bolts 35 engage the gripping pawls 32 closely below the pivot bolts 33, and on the other hand are connected to the lower end of a rod 37 by a common joint bolt 36. Rod 37 is in vertical direction slidably guided in a bushing 38 which extends from the bottom 19 in downward direction.

The two rods 37 respectively pertaining to a pair of gripping pawls 32 are by means of the upper end through a yoke plate 39 above the bottom 19 connected to each other. In the center of the gripping tool 24 there is provided a pressure spring 41 which is located in a socket 40 which extends in downward direction from the bottom 19.

For purposes of actuating the gripping pawls 32 there is provided a pneumatic power operable device with a cylinder 42 which is mounted on the bottom 18 and comprises a piston 43. A punch 44 mounted on the piston 43 is passed through a bore in the bottom 18 and closes the cylinder 42 at its lower end, said punch 44 resting on the yoke plate 39. Punch 44 is continued upwardly by a piston rod 45 which passes upwardly through a bore in a cover 46 closing off the upper portion of cylinder 42.

A further similar pneumatic power operable device for lifting and lowering the pot-shaped slide 22 is arranged within the lower portion 2 of the gripping body above the other power operable device. Its cylinder 47 is located on the intermediate bottom 6. From the pertaining piston 48, a hollow piston rod 49 extends downwardly through a bore of the intermediate bottom 6. The pot-shaped slide 22 is connected to the lower end of the piston rod 49. In upward direction, the hollow piston rod 49 is passed through a bore provided in a cover 50 which closes off the cylinder 47. Above the cover 50 there is an annular disc 51 mounted on the hollow piston rod 49 which annular disc serves as lower counterbearing for a helical pressure spring 52.

This spring on one hand rests against a lock or latch 53 in a mounting 54 which is located on the cover 50.

This piston rod 45 extends through a bore in the latch or lock 53 and beyond said latch 53 and at its upper end carries an annular disc 55 which serves as lower counterbearing for a helical pressure spring 56. This spring rests in upward direction against an additional latch 57 of the mounting 54.

The piston rod 45 has a bore therethrough throughout its length. In this bore, a feeler rod 58 is slidably guided. The feeler rod 58 has that end thereof which projects beyond the latch 57 provided with a cam piston 59. A helical pressure spring 60 which rests in upward direction against an additional latch 61 of the mounting 54 with a downwardly directed force acts upon the cam piston 59. A limit feeler 62 rests against the cam piston 59 and by a signaling conductor is connected to an indicating instrument provided in the control panel of the loading device.

Connected to each of the two cylinders 42, 47 below and above the pistons 43 and 48 respectively is an air-conveying conduit 63, 64, 65, 66. The hose couplings 67 are closed after having been assembled.

The following locking device is provided for the helical pressure springs 52 and 56. On the mounting 54 there is mounted a two-arm lever 72 which is adapted to be pivoted about a horizontal axis 73. One lever arm of this lever is provided with a pin 74 which with play passes through an opening in the collar 4.

The lower end of the other lever arm has a rounded edge 75 serving as deflector. Above said edge 75, said lever arm has a nose 76. Two flat bars 77, 78 are pivotally mounted on extensions of the annular discs 51 and 55. These flat bars are laterally displaced relative to each other. The flat bar 77 is more than twice as long as the flat bar 78. These flat bars are by leaf springs 150, 151 held with their upper ends in engagement with the end of the two-arm lever 72 which end comprises the edge 75 and the nose 76.

The walls of the box 3 as well as the walls 7 guided therein have perforations 80, 81 which partially overlap each other.

FIG. 4 shows a control rod-gripping tool 82 which in the same manner as the fuel element-gripping tool 24 is by means of the balls 20 coupled to the lower section 2 of the gripping body. The tool 82 has the same fingers 25 as the fuel element-gripping tool 24 and is mounted in the same manner as the gripping tool 24 on a fuel element head 26. Control bars 83 are from above inserted into the bores of the pertaining fuel element. Their ends, which project considerably beyond the fuel element are at the top connected to each other by a rod head 84. Centrally located in said rod head 84 is a sleeve which is continued below the rod head 84 in the form of a collar 85. This collar 85 immerses in the position shown in FIG. 4 into a bore of a sleeve 86 which extends from the lower plate 87 of the fuel element head 26 in upward direction and contains an annular groove into which balls 91 may enter from radial bores of the collar 85. The rod head 84 rests upon the upper end face of the sleeve 86 through the intervention of a ring 88 which surrounds the collar 85. A control bar 89 is slidably guided in a central bore of the sleeve. The sliding movements are limited by a horizontal bolt 90 which with its two ends is firmly located in the bores of the ring 88 and of the collar 85 and extends through a slot in the control bar 89. Below said slot, the control bar 89 has a groove 92. This sleeve extends from the bar head 84 in upward direction. The respective sleeve part 93 has a widened bore within which the control bar 89 is guided by means of a piston 94. A pressure spring 95 acts upon said piston 94 from below.

A collar 96 fittingly immerses into the bore of the sleeve part 93. The collar 96 extends from the bottom 19 of the bar gripping tool 82 in upward direction. In radial bores of this collar 96 there are located balls 97 which with the coupling position shown in FIG. 4 extend into an annular groove of the sleeve part 93. The balls 97 are prevented from leaving the annular groove by means of a bolt 98 which is vertically slidably guided in a bore of the collar 96. That end of bolt 98 which projects beyond the bottom 19 is connected to a yoke plate 99. Helical springs with their force directed upwardly act upon the two ends of the yoke plate 99, said helical springs being arranged in sockets extending downwardly from the bottom 19. In the illustrated position, the punch 44 of the pertaining power operable device rests on the yoke plate 99.

According to the illustration in FIGS. 1, 2 and 3, the fuel element-gripping tool 24 is in the described manner by means of balls 20 coupled to the lower section 2 of the gripping body. This tool is located on the fuel element head 26. The gripping pawls 32 are in conformity with the illustration occupying their closing position indicated by full lines in FIG. 2. Their hook-shaped ends thus extend through the windows 31. In conformity with this closing position, the piston 43 of the lower power operable device is by the upper pressure helical spring 56 moved into the lower end position. Accordingly, the punch 44 will through the yoke plate 39 press the bars 37 downwardly which corresponds to the closing position of the gripping pawls 32. Consequently, the annular disc 55 occupies its lower end position. From this position, the annular disc 55 cannot be lifted because the upper section 1 of the gripping body is relative to the lower section 2 moved upwardly by the stroke h so that the two-arm lever 72 is shifted in clockwise direction into the position shown in FIGS. 1 and 5 and is held fast in this position. In this position, the nose 76 rests upon the upper ends of the flat bars 77, 78 so that the annular discs 51 and 55 are held in their lower positions, consequently it is not possible to move upwardly the pistons 43 and 48 by compressed air which could possibly be introduced into the lower chambers of the cylinders 42 and 47, and consequently it is not possible to compress the helical pressure springs 52 and 56, respectively. In this way the coupling between the fuel element-gripping tool 24 and the fuel element head 26 is assured by means of the gripping pawls 32, and also the coupling between the lower section 2 of the gripping body and the fuel element gripping tool 24 is assured by the balls 20. Consequently, when by lifting the gripping body 1, 2, the fuel element has been pulled out of its position bearing, there does not exist the danger that in view of a loosening of one of the two couplings the fuel element will drop out.

Figure 5:
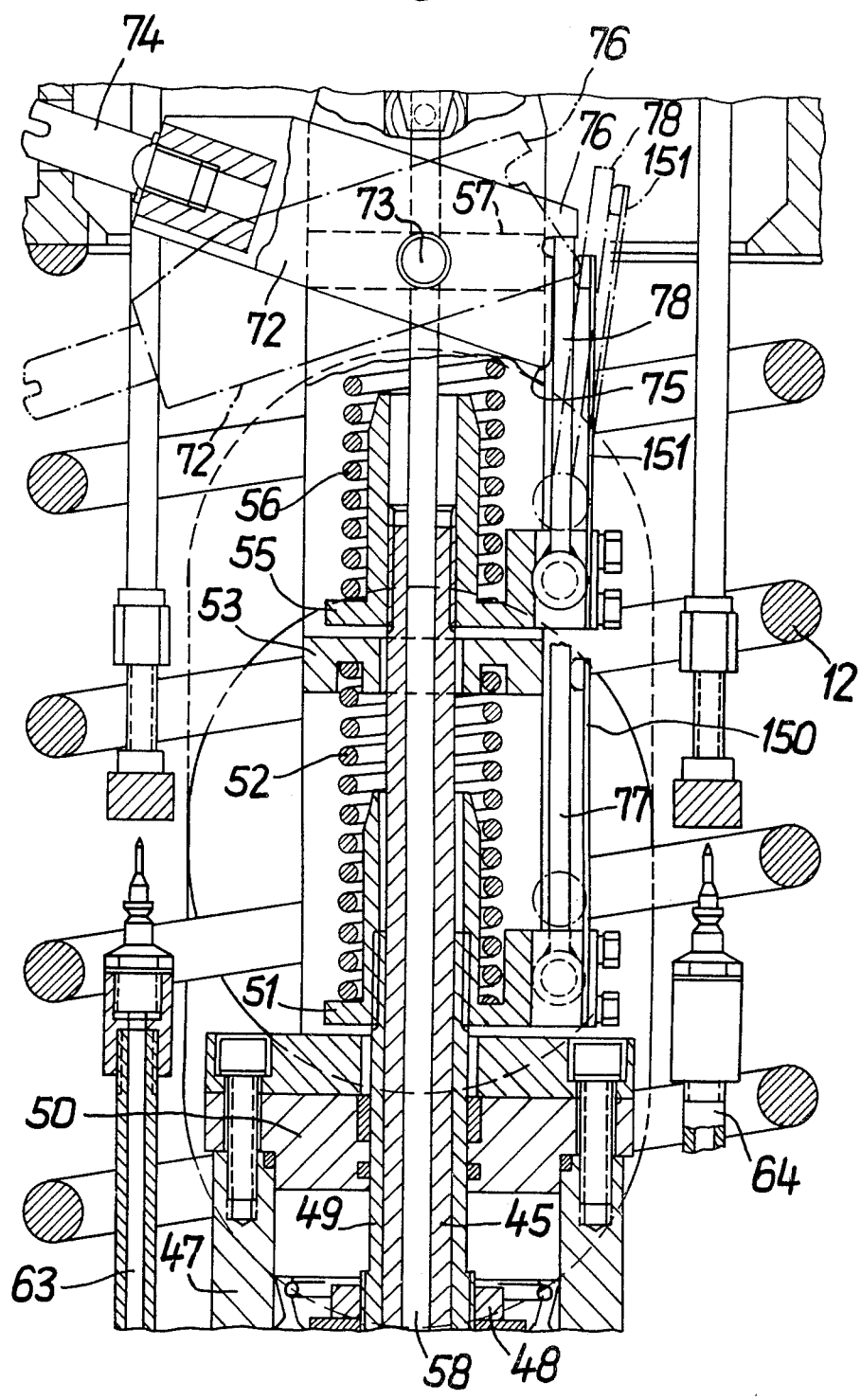
FIG. 5 is a cutout of FIG. 1, but on a considerably larger scale than that of FIG. 1.

When the fuel element head 26 is to be disengaged from the fuel element-gripping tool 24 the fuel element is lowered into a position bearing so that the fuel element-gripping tool 24 and the lower section 2 of the gripping body cannot further move upwardly. When subsequently the upper section 1 of the gripping body is further lowered, it moves downwardly until the annular surface 11 is seated upon the upper end face 10 of the walls 7. In this connection, the helical pressure spring 12 has been compressed by the distance $h$ which brings about a cushioning of the shock when said gripping tool touches ground. In this way the two-arm lever 72 is turned in counterclockwise direction into the disengaging position which is shown in FIGS. 1 and 5 with dot-dash lines. The edge 75 will as deflector move the flat bars 77, 78 against the thrust or resistance of the leaf springs 150, 151 from the coupling positions illustrated in full lines in FIG. 5 into coupling ready positions while the upper ends of the flat bars 77, 78 protrude beyond the reach of the nose 76. Thereupon, for purposes of disengaging the fuel element 26 compressed air is passed through the conduit 63 below the piston 43, as a result of which, the conduit 64 air escapes from the cylinder 42. Consequently, the piston 43 is by compressing the spring 56 moved upwardly whereby the gripping pawls 32 are under the influence of spring 41 pivoted into the release position. During the movement of the piston 43 in upward direction, the flat bar 78 which takes part in this movement is pushed along the edge 75 so that its upper end is pivoted into FIG. 5 position illustrated in dot-dash lines which represents the release position. However, the flat bar 77 remains in its coupling-ready position. The noses 100 located at the lower ends of the gripping pawls are freed from the upper edges of the respective windows 31 because the fuel element - gripping tool 24 by a setting down onto fuel element 26 placed upon the position bearing has been lowered relative to said head 26 by a distance which is slightly greater than the height of the noses 100. When now the upper section 1 of the gripping body is lifted, it first moves relative to the standing still lower section 2 by the stroke $h$.

In this way the two-arm lever 72 is turned in clockwise direction into its blocking position. In this connection, the nose 76 moves past the upper end of the flat bar 78 so that the piston 43 remains in its upper position due to the effect of the compressed air which means that the gripping pawls 32 retain their spread position. Consequently, when the gripping body 1, 2 is lifted further, the fuel element head 26 is not taken along. Only when the gripping tool 24 is withdrawn from said head 26, will the compressed air be discharged from below the piston 43. Consequently, due to the effect of spring 56, the piston 43 and with the same the flat bar 78 move downwardly. The upper end of bar 78 slides along the nose 76 and when the piston 43 has reached its lower end position will under the pressure exerted by spring 151 enter its coupling position in which its upper end is located below the nose 76. As a result thereof, the gripping pawls 32 are moved into closing position and are locked in the latter. The flat bar 77 on the other hand has during the lifting of the upper section 2 of the gripping body moved out of its coupling-ready position and immediately into the coupling position in which its upper end is located below the nose 76. Consequently, the piston 48 is secured in its lower position so that the coupling connection between the gripping tool 24 and the lower section 2 of the gripping body cannot be disengaged.

The disengaging of the fuel element-gripping tool 24 from the lower section 2 of the gripping body is effected in a corresponding manner. To this end it is necessary that the fuel element-gripping tool 24 is placed upon a support so that during a further downward movement of the upper section 1 of the gripping body, the latter will relative to the lower section 2 which is not further moved downwardly, be moved downwardly. Consequently, the two-arm lever 72 is, in counterclockwise direction, turned into the disengaging position so that the flat bars 77, 78 are by means of the edge 75 tilted into the coupling-ready position. Thereupon, the piston 48 is lifted by compressed air from conduit 65 while the spring 52 is compressed so that the slide 22 is lifted into the release position, and the balls 20 can leave the annular groove 21. In this connection, the flat bar 77 is moved along the edge 75 upwardly into the free position. When subsequently the upper section 1 of the gripping body is lifted and moves relative to the lower section by the stroke h, the two-arm lever 72 reaches its blocking position without the flat bar 77 being taken along in downward direction by the nose 76. Therefore, the piston 48 remains in its upper position. Only when, after the sleeve 13 has been pulled out of the bore 17, the compressed air below the piston 48 has been discharged, will the piston 48 drop to its lower position so that the balls 20 move out of the radial bores of sleeve 13. In this connection, the flat bar 77 is by the leaf spring 150 pressed into coupling position so that the piston 48 is blocked.

When a gripping tool — this applies to the fuel element-gripping tool 24 as well as to the control bar - gripping tool 82 — is to be coupled to the lower section 2 of the gripping body, the section 2 is first lowered to such an extent that the balls 20 which protrude outwardly set down onto the conical surface 15.

Consequently, the upper section 1 of the gripping body will during a further downward movement move downwardly by the stroke h so that the locking of the annular discs 51 and 55 is made ineffective. Now the slide 22 is lifted by compressed air conveyed below the piston 48. Consequently, the balls 20 are by the inclined surface 15 pressed inwardly so that the collar 13 can enter into the bore 17 until the flange 16 rests upon the upper end face of the tool. In this connection, the balls 20 enter the annular groove 21 when the slide 22 is moved downwardly into the position shown in FIGS. 1, 2 and 4. This occurs when the compressed air is discharged from the cylinder chamber below the piston 48 due to the effect of the helical compression spring 52 and as the case may be aided by compressed air from the conduit 66. During the following lifting of the upper section 1 of the gripping body, the latter moves relative to the lower section 2 upwardly again by the stroke h so that the locking of both power operable devices is again established.

The coupling of the bar head 84 to the control bar-gripping tool 82 is effected by a downward movement of the punch 44 in the manner shown in FIG. 4, and more specifically, under the influence of the spring 56, when the compressed air is discharged from below the piston 43. Consequently, the bolt 98 moves behind the balls 97 so that the balls must remain in the annular groove of the sleeve part 93. Simultaneously, by means of the bolt 98, the control bar 89 is moved into the position shown in FIG. 4 so that the balls 91 enter the groove 92 which means that the bar head 84 is disengaged from the sleeve 86 of the fuel element-head 26.

When consequently by lifting the gripping body, the control bars 83 are being pulled out from their position bores in floating condition are conveyed further, the coupling between the control bar-gripping tool 82 and the lower section 2 of the gripping body as well as the coupling between the bar head 84 and the control bar-gripping tool 82 remains secured because the pistons 43 and 48 are secured in their lower end positions by the flat bars 77 and 78 through the intervention of the two-arm lever 72 which due to the upward pulling of the upper section 1 of the gripping housing is pivoted relative to the lower section 2 in clockwise direction.

The uncoupling of the bar head 84 from the control bar-gripping tool 82 can be effected only when the control bars 83 have moved into their position bores and therefore the bar head 84 cannot move downwardly further. In this connection, by a further downward movement of the upper section 1 of the gripping body relative to the lower section 2 standing still, the locking is made ineffective in conformity with the pivoting of the two-arm lever 72 in counterclockwise direction so that the piston 43 can by compressed air be moved into the release position in upward direction against the resistance of the spring 56, of the balls 97, and move out of the annular groove of sleeve 93. In this position the piston 43 remains, also if subsequently the upper section 1 of the gripping body has been lifted by the stroke h relative to the lower section 2 and if the two-arm lever 72 is turned into its blocking position. It will be appreciated that in this connection the lifted upper end of the flat bar 78 has been brought into the free position.

Only when the collar 96 has been pulled out of the sleeve 93 will the compressed air be discharged from below the piston 43 so that the balls 97 will again move into blocking position. In this connection, the flat bar 78 lowered together with the piston 43 will engage the coupling position below the nose 76.

The perforations 80 and 81 will in all conditions of the gripping device permit a relatively easy observation of the parts in the interior of the box 3, especially of the helical pressure springs 52 and 56. Also an exchange of these parts will consequently be relatively easy.

It is, of course, to be understood that the present invention is, by no means, limited to the specific showing in the drawings, but also comprises any modifications within the scope of the appended claims.

What is claimed is:

1. In a gripping device adapted for cooperation with gripping tools constructed for releasable engagement with longitudinally extending bodies; said device comprising a body adapted for suspension from a lifting and transporting mechanism, said body including an upper part and a lower part in telescopic reciprocable engagement, upper and lower power operable devices in said lower part, gripping means carried by said lower part for coupling the lower part to a gripping tool and connected to said upper power operable device, said lower power operable device adapted for actuating the gripping tool connected to said lower part for coupling the gripping tool to a body to be lifted thereby, respective spring means biasing said power operable devices in coupling direction, a sleeve connected to each power operable device and extending upwardly therefrom, said sleeves being in slidable telescopic engagement, said springs surrounding said sleeves and at one end bearing on a support stationary with said second part and at the other end bearing on a plate connected to the respective sleeve.

2. A gripping device according to claim 1 which includes a locking mechanism operable to lock said power operable devices in coupling position, said locking mechanism being carried by said parts of said gripping body and moved thereby into locking position in response to upward movement of said upper part on said lower part.

3. A gripping device according to claim 2 in which said locking mechanism includes respective rods connected to said plates on said sleeves and a blocking lever for locking engagement with said rods, said lever being moved into locking position by upward movement of said upper part of said body on the lower part thereof and when in locking position engaging said rods when the respective power operable devices are in coupling position, each said rod being biased toward locking lever engaging position.

4. A gripping device according to claim 2 in which said locking mechanism includes a rod connected to each said plate and extending axially upwardly therefrom and a locking lever pivoted on said lower part of the body and having one end engaged by said upper part of the body, the other end of said lever having a ledge region which engages the upper ends of said rods when the power operable devices are in coupling position and said lever is moved into locking position by upward movement of said upper part on said lower part, said lever having a deflecting region which engages said rods and moves the rods out of the range of said ledge region when the lever is pivoted to unlocking position by downward movement of said upper part on said lower part.

5. A gripping device according to claim 4 in which each rod at the lower end is pivotally connected to the respective plate, said rods being laterally offset from each other, and a spring for each rod biasing the upper end of the rod toward the said other end of said locking lever.

* * * * *